(12) United States Patent
Kao

(10) Patent No.: US 6,563,611 B1
(45) Date of Patent: May 13, 2003

(54) DOUBLE SIDE SCANNER MODULE

(75) Inventor: Will Kao, Hsinchu (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 09/311,601

(22) Filed: May 13, 1999

(51) Int. Cl.[7] ............................................... H04N 1/04
(52) U.S. Cl. ...................................... 358/498; 358/497
(58) Field of Search ............................... 358/497, 498, 358/496, 404, 408, 474; 382/313

(56) References Cited

U.S. PATENT DOCUMENTS

| | | | | |
|---|---|---|---|---|
| 4,743,974 A | * | 5/1988 | Lockwood | 358/28 |
| 4,921,236 A | * | 5/1990 | Saeki | 271/3.1 |
| 4,928,151 A | * | 5/1990 | Saeki | 355/320 |
| 4,975,749 A | * | 12/1990 | Tsunoda | 355/320 |
| 5,610,731 A | * | 3/1997 | Itoh | 358/496 |
| 5,619,343 A | * | 4/1997 | Amemiya | 358/404 |
| 5,812,279 A | * | 9/1998 | Fukushima | 358/404 |
| 5,943,451 A | * | 8/1999 | Lee | 382/313 |

* cited by examiner

Primary Examiner—Jerome Grant, II
Assistant Examiner—Negussie Worku

(57) ABSTRACT

A scanner module with a single image information reading device is provided to read both sides of an original. The scanner module mainly comprises: a paper feeding device, and a paper output device for providing an I/O path for the original. The paper feeding device is connected to a scan station. The scan station comprises a glass window and a pinch roller which locates against the glass window. Beneath the glass window, there is an image information reading device. Under the guidance of the pinch roller, an original will be conveyed progressively from the paper feeding device and through the glass window for the image information reading device to read the first side of the original. The original will be inverted while passing through an inversion device. At the mouth of the inversion device, there is a document sensor. When the original leaves the inversion device, the sensor will generate a control signal to the pinch roller and enable the pinch roller to rotate in an opposite direction. The inverted original will be guided through the glass window with the guidance of the pinch roller. Consequently, the image information reading device can read the other side of the original.

6 Claims, 4 Drawing Sheets

DOUBLE SIDE SCANNER MODULE

BACKGROUND OF THE INVENTION

A. Field of the Invention

The present invention relates to a double side scanner module, especially to a double side scanner module that applies only a single image information reading device for reading both sides of an original.

B. Description of the Prior Art

A conventional scanner or facsimile machine can only scan one side of an original. If a user wants to scan two sides of an original, he has to manually turn over the original to the other side and scan the original once again. A scanner that usually provides the function of double side scanning is a copy machine. An U.S. Pat. No. 4,536,077, "Multi-Mode Scanner" by James C, Stoffel disclosed a scanner which is capable of scan either one side or two sides of an original using only a single Charge Coupled Device (CCD). Stoffel's scanner can scan one side of the original for each pass. As illustrated in FIG. 1, the original 12 is placed in a paper tray 13. When scanning, the original 12 passes an inversion section 18 to a scan station 14. A pinch roller 17 with a document sensor (not shown) can detect the original when it advances through the document sensor. When the document sensor detects a front end of the original, the CCD 11 starts to read the image of the original passes thereon. Thus, when the original 12 is completely passing the scan station 14, the CCD 11 also completes reading the first side of the original. Then, the original is progressively conveyed to another inversion section 15 to have the scanned side turned upside down. Then, the inverted original 12 is returned to the paper tray 13. Since the original 12 has been inverted, thus the other side of the original 12 can be scanned following the same procedure again. If the user only wants to scan only one side of the original, the original 12 can be placed on the sheet table 19. Then, the CCD 11 which is mounted on a pair of shafts 16 can read the image information of the original progressively while being driven along the sheet table 19.

One of the disadvantages for Stoffel's invention is that the inversion path is too long. Consequently, it takes a long time to scan two sides of an original. Moreover, the structure taught by Stoffel is also quite complicated. It will be difficult to adopt the invention of Stoffel to a flatbed scanner or a facsimile machine, so as to automatically read the images on the two sides of an original.

SUMMARY OF THE INVENTION

Accordingly, it is an object of the present invention to provide a scanner module which can use only a single image information reading device to read the images on the two sides of an original.

It is another object of the present invention to provide a simple-structured scanner module, so as to reduce the size of a scanner or a facsimile machine, and further reduce the manufacture cost.

It is yet still another object of the present invention to provide a scanner module which is adaptable to various still image reading device using only a single image information reading device to read images on both sides of an original.

In accordance with invention, a scanner module with a single image information reading device is provided to read both sides of an original. The scanner module mainly comprises: a paper feeding device, and a paper output device for providing an I/O path for the original. Moreover, the paper output device and the paper feeding device are disposed at the same side for the convenience of operation. The paper feeding device is connected to a scan station. The scan station comprises a glass window and a pinch roller which locates against the glass window. Beneath the glass window, there is an image information reading device. Under the guidance of the pinch roller, an original will be conveyed progressively from the paper feeding device and through the glass window for the image information reading device to read the first side of the original.

The other side of the scan station is connected to an inversion device. When the original is guided through the inversion device, the two sides of the original will be switched. At the mouth of the inversion device, there is a document sensor. When the original leaves the inversion device, the sensor will generate a control signal to the pinch roller and enable the pinch roller to rotate in an opposite direction. The inverted original will be guided through the glass window with the guidance of the pinch roller. Consequently, the image information reading device can read the other side of the original. Finally, the original will be guided towards the paper output device for the user to pick up.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
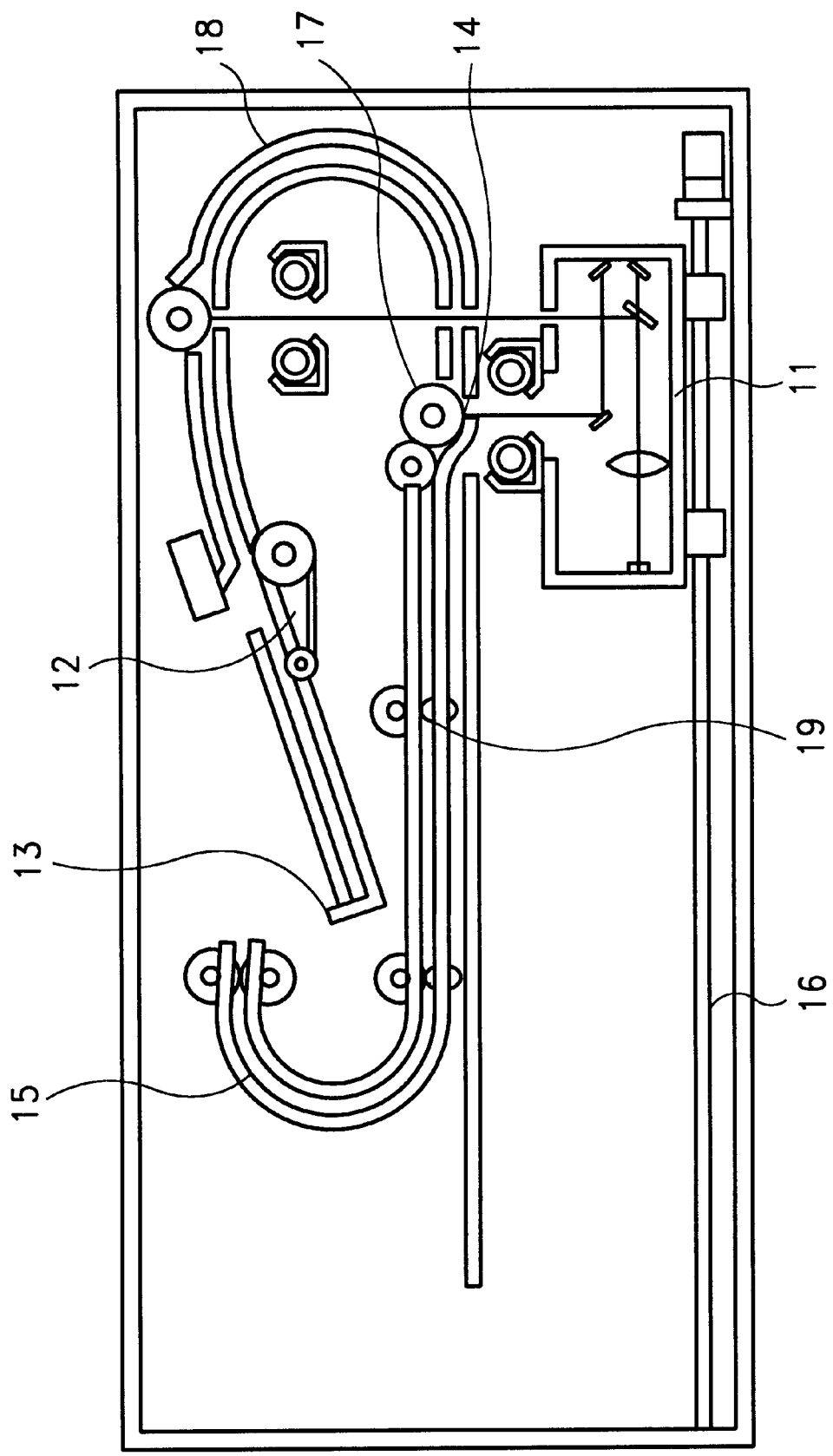
FIG. 1 is a schematic diagram showing the structure of a convention scanner using a single image information reading device to read the both sides of an original.
Figure 2:
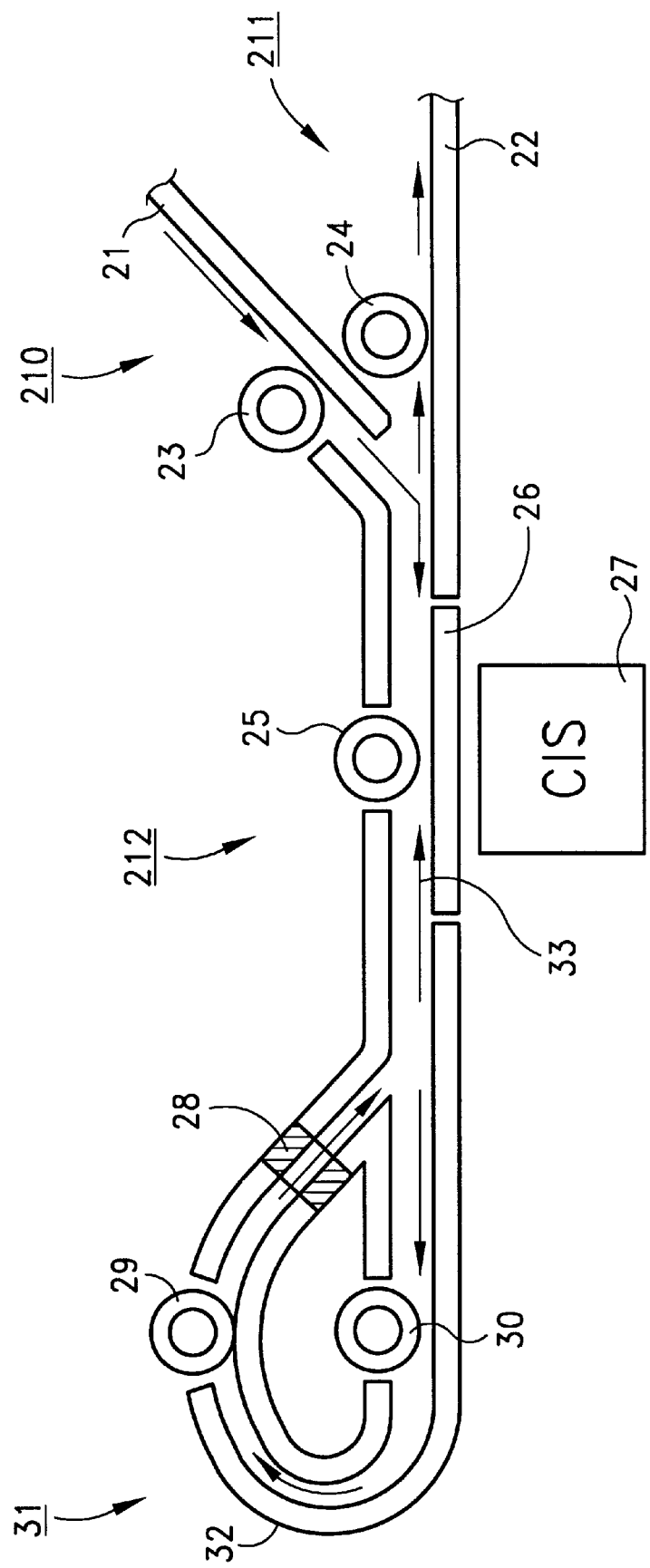
FIG. 2 is a schematic sectional diagram showing the structure of the present invention according to a preferred embodiment of the present invention.

The preferred embodiment of the present invention is illustrated in FIG. 2. The double side scanner module of the present invention mainly comprises a paper feeding device 210, a paper output device 211, a scan station 212, an inversion device 31, and an image information reading device 27.

For the convenience of operation, the paper feeding device 210, and the paper output device 211 are at the same side. The paper feeding device 210 comprises a paper tray 21 and a roller 23. The paper tray 21 may be slightly inclined. The paper tray 21 can keep multiple pieces of originals inside. When an original is sent to scan, the roller 23 above the paper tray 21 rotates in a first direction to sequentially guide the originals in the paper tray 21 into the scan station 212. The scan station comprises a glass window 26 and a pinch roller 25 which locates against the glass window 26. The glass window 26 can be made of glass or any transparent material for the light of the image information reading device 27 to pass through. The image information reading device 27 can be a Contact Image Sensor or a Charge Couple Device. Above the glass window 26, there is a pinch roller 25. When an original is fed into the glass window 26, the pinch roller 25 rotates in the same direction as that of the roller 23. Consequently, the original will be conveyed towards the inversion device 31 with the aids of the pinch roller 25. At the time when the original is conveyed progressively through the glass window 26, the image information reading device 27 also completes the reading of the image on the first side of the original.

The inversion device 31 is a loop which has an input path and an output path. The inversion device 31 comprises at least two rollers 29, 30 for controlling the moving direction of the original from the input path to the output path. The roller 30 rotates in the same direction as that of the roller 23 of the paper tray 21 for guiding the original from the glass window 26 to the inversion device 31. The roller 29 rotates in the direction same as that of the roller 30 for guiding the original from the inversion device 31 to the scan station 212.

At the mouth of the inversion device 31, there is a document sensor 28. When the document sensor 28 detects an end of an incoming original, the document sensor 28 will send a control signal to the pinch roller 25 for reversing the direction of its rotation. Consequently, the pinch roller 25 will rotate in the opposite direction to guide the original into the paper output device 211 via the glass window 26. Since the two sides of the original have been inverted, the scanned side will face up so as to allow the image information device 27 to read the unscanned side of the original.

Since the paper feeding device 210 is slightly inclined, the original will be conveyed along the output path to the paper output device 211. The paper output device 211 also comprises a roller 24 and a paper tray 22. The roller 24 will rotate and guide the original towards the paper tray 22 for the user to pick up.

Figure 3:
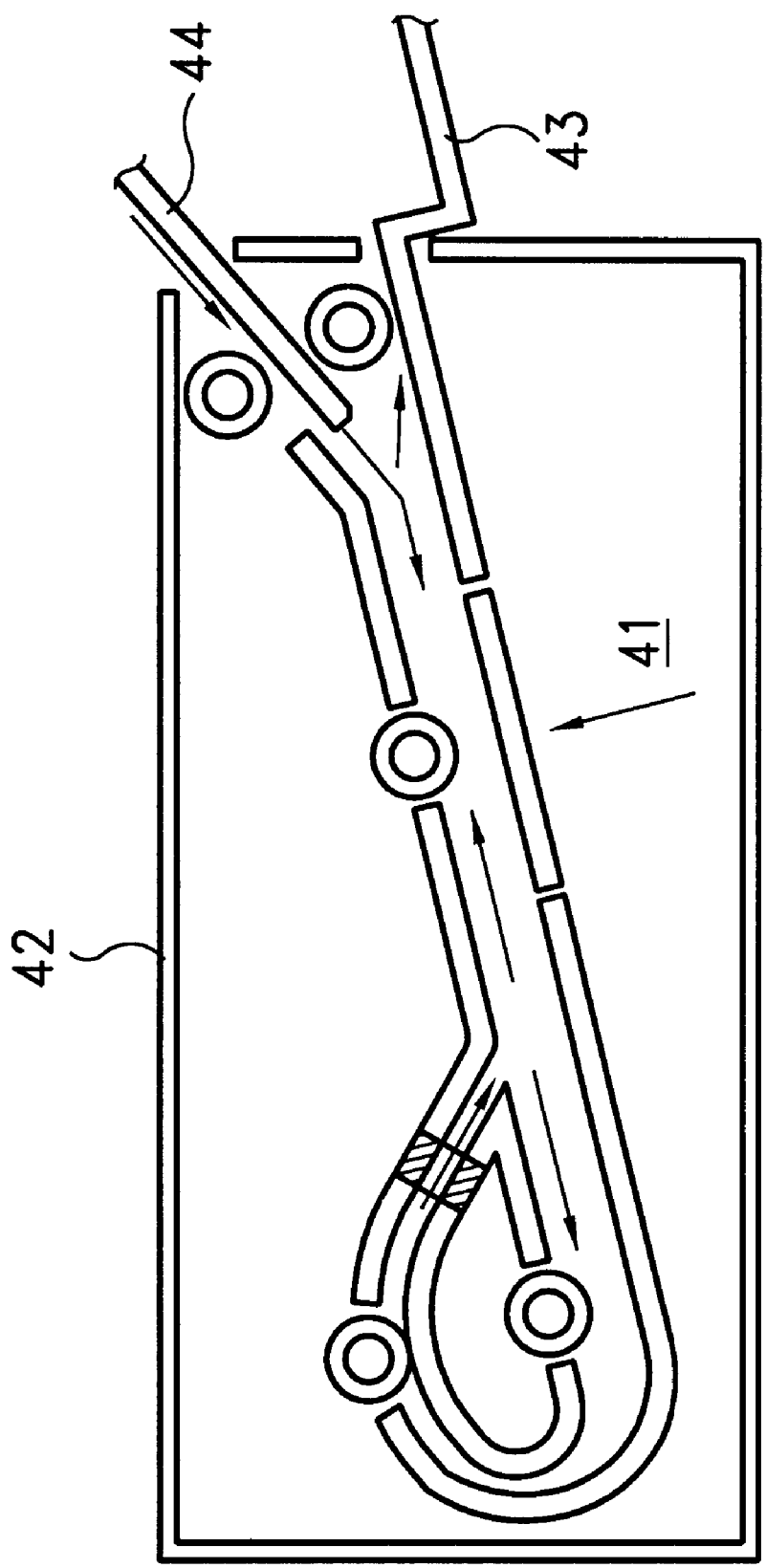
FIG. 3 is another schematic sectional diagram showing the structure of the present invention according to a preferred embodiment of the present invention.

For the convenience of maintenance, the inversion device 31 will be detachable. Moreover, in practice, the distance between the pinch roller and the inversion device shall be larger than the length of an original, so as to prevent from paper jam. To further reduce the size of a scanner or a facsimile machine, the inventive scanner module 41 can be installed slightly inclined in a housing 42 as illustrated in FIG. 3. The scanner module 41 is the same as that of FIG. 2. The paper feeding device 43 and the paper output device 44 is also at the same side for the convenience of operation.

Figure 4:
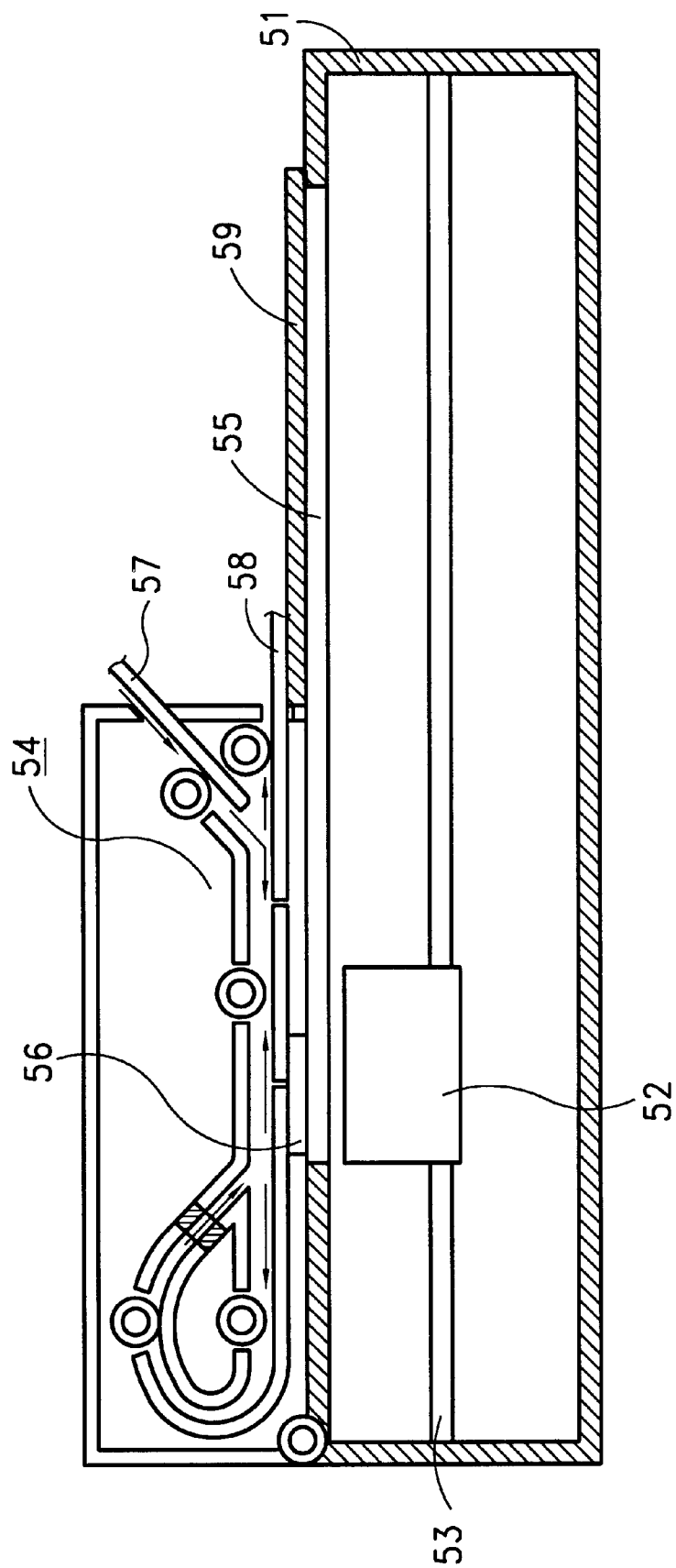
FIG. 4 is another schematic sectional diagram showing the structure of the present invention when applied to a conventional flatbed scanner.

The inventive scanner module can also be adapted to a conventional flatbed scanner as illustrated in FIG. 4. The inventive scanner module 54 can be integrated with a conventional cover 59 of a flatbed scanner 51. The cover 59 is pivotally movable for covering an original while scanning. The cover 59 leaves a glass window 56 for the image information device 52 to read the image of the original while scanning the images on the two sides of an original. When scanning a single side of an original, the original is placed on the sheet table 55 for the image information device 52 to read. The image information device 52 which can be either a CIS or a CCD is mounted on a pair of guiding shafts 53 to read the image of the original while being driven along the sheet table 55. On the other hand, if the user wants to scan both sides of an original, the original is fed into the paper feeding device 57. The image information reading device 52 will be driven to the location right beneath the glass window 56 to read the image of the original. The operation is the same as that of FIG. 2. After the scanning is complete, the original can be removed from the paper output device 58.

The inventive scanner module can be designed as a detachable module too so that it can be mounted on top of a conventional housing for double side scanning. Additionally, the inventive scanner module is also adaptable to a facsimile machine. The difference is that the image of a flatbed scanner is sent to a computer for processing while the image of the facsimile machine is sent to a remote site via a modulation/demodulation module.

Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A double side scanner module comprising:

a scan station comprising a glass window having a first end and a second end, and a pinch roller located against the glass window, wherein the pinch roller rotates in a first direction to guide an original from the first end to the second end of the glass window and the pinch roller rotates in a second direction to guide the original from the second end to the first end of the glass window;

paper feeding means comprising a first paper tray for placing originals, and a first roller against the first paper tray, wherein the first roller rotates in the first direction to sequentially guide each of the originals from the first paper tray into the first end of the glass window;

inversion means comprising a fixed loop path having an input path and an output path, a third roller in the input path, and a forth roller in the output path, wherein the third roller and the forth roller rotate in the first direction to guide each of the originals from the second end of the glass window into the input path and through the out path then to the second end of the glass window, thereby to turn the original upside down, and the distance between the pinch roller and the inversion means is larger than a length of an original;

a document sensor installed close to the mouth of the output path of the inversion means for sending a control signal to the pinch roller upon sensing a front end of the original, whereby the pinch roller is rotated in the second direction to convey the original from the second end to the first end of the glass window;

paper output means comprising a second paper tray for placing originals and a second roller against the second paper tray, wherein the second roller rotates in the second direction to sequentially guide each of the originals from the first end of the glass window into the second paper tray; and image information reading means disposed at an outer side of the glass window for reading an image on a first side of the original upon the original is moving progressively from the first end to the second end of the glass window and for reading an image on a second side of the original upon the original is moving progressively from the second end to the first end of the glass window.

2. The module as claimed in claim 1, wherein the image information reading means is a single contact image sensor.

3. The module as claimed in claim 1, wherein the image information reading means is a single charge couple device.

4. The module as claimed in claim 1, wherein the inversion means is detachable.

5. The module as claimed in claim 1, wherein the inversion means is adaptable to be integrated with a cover of a flatbed scanner.

6. The module as claimed in claim 1, further comprising:

a modulation/demodulation module for sending an image read by the image information reading device to a remote site.

* * * * *